United States Patent [19]

Halliwell

[11] Patent Number: 4,601,580
[45] Date of Patent: Jul. 22, 1986

[54] MEASUREMENT OF OSCILLATORY AND VIBRATIONAL MOTION

[75] Inventor: Neil A. Halliwell, Southampton, England

[73] Assignee: University of Southampton, Southampton, England

[21] Appl. No.: 523,809

[22] Filed: Aug. 16, 1983

[30] Foreign Application Priority Data

Aug. 18, 1982 [GB] United Kingdom ............... 8223854

[51] Int. Cl.$^4$ .......................... G01B 9/02; G01P 3/36
[52] U.S. Cl. .................................. 356/349; 356/350; 73/657
[58] Field of Search ............... 73/650, 657; 356/28.5, 356/349, 350

[56] References Cited

U.S. PATENT DOCUMENTS

| | | | |
|---|---|---|---|
| 3,782,176 | 1/1974 | Jacobs | 73/657 |
| 3,796,495 | 3/1974 | Laub | 356/349 |
| 3,879,988 | 4/1975 | Jacobs | 73/657 |
| 4,347,748 | 9/1982 | Pierson | 73/862.34 |
| 4,512,661 | 4/1985 | Claus et al. | 73/657 |

FOREIGN PATENT DOCUMENTS 8103073 10/1981 PCT Int'l Appl. ............... 356/28.5

*Primary Examiner*—Stewart J. Levy
*Assistant Examiner*—John E. Chapman, Jr.
*Attorney, Agent, or Firm*—Flynn, Thiel, Boutell & Tanis

[57] ABSTRACT

A device for monitoring torsional vibrations in a rotary shaft comprises a laser source, a 50% transmission-reflection beamsplitter and a mirror arranged to provide two spaced parallel laser beams and which strike the surface of the shaft at points A and B respectively. Since the shaft surface is moving, light backscattered at the surface is Doppler shifted and since the velocity of the surface at points A and B differs, the frequency of light backscattered at the two points is shifted by different amounts. Light backscattered along the axes of the incident beams is mixed and directed into a detector where it heterodynes. The frequency at which the detected light intensity is modulated is directly proportional to the speed of rotation of the shaft. The device, and the method it embodies, can be used to measure the difference in velocity at two points on any surface undergoing non-uniform motion and can, therefore, be used generally to characterize vibrational motion.

9 Claims, 3 Drawing Figures

MEASUREMENT OF OSCILLATORY AND VIBRATIONAL MOTION

BACKGROUND AND SUMMARY OF THE PRIOR ART

The present invention relates to a method and apparatus for continuously monitoring the instantaneous movement of a surface whose motion is non-uniform and for measuring torsional vibrations in rotary machine parts.

If such vibrations are not sufficiently controlled they lead very quickly to fatigue failure of the rotary parts. There is, therefore, a need for apparatus capable of realiably detecting and measuring torsional vibrations in rotary machine parts. Existing methods for measuring such vibrations in rotating shafts involve the use of slip rings or slotted discs which are physically mounted on the shaft. Using slotted discs, a transducer monitors the number of slots which pass it in each revolution of the shaft and variations in the rate at which the slots reach the transducer over a period of time provide an indication of the level of torsional vibration in the shaft. As it is necessary to mount the slotted disc on the shaft each time a measurement is to be made, this method is time-consuming and cannot be used where access to the shaft is restricted and there is not sufficient room for the slotted disc to be mounted on the shaft. Furthermore, this method has a limited frequency response over the frequency ranges which are of interest.

One known device which utilizes a non-contact method and which overcomes some of these disadvantages is he laser-Doppler velocimeter. A beam from a laser source is split, in a conventional manner, to form two parallel beams which are focused by a lens so that they intersect at the surface of the rotating shaft. The frequency of the light which is backscattered at the surface of the shaft is Doppler shifted because the shaft surface is moving. As the two laser beams are coherent, the backscattered light from the two beams heterodynes at a detector positioned to receive it and the detected intensity is modulated at a frequency which is a function of the speed at which the surface is moving. Consequently, variations in the modulation frequency as the shaft revolves provide an indication of the level of torsional vibration.

Although this device avoids the need for mounting slip rings or slotted discs on the shaft, it has a number of disadvantages. The velocimeter must be arranged so that the shaft surface lies within the region where the beams intersect. As this region is generally only a fraction of a millimeter in length, accurate positioning of the device is necessary and hand-held use is not possible. Furthermore, this method is, of course restricted to shafts of circular cross-section. Again, in circumstances where access to the shaft is restricted, it may not be possible to position the device so that the intersection of the beams occurs at the shaft surface at all. It is also desirable that the modulation frequency should be within the frequency range for which the electronic circuitry used to process the detector output gives an optimum response. The modulation frequency is critically dependent on the speed of movement of the shaft surface and the velocimeter cannot, therefore, easily be used to measure a very wide range of speeds. The only other factors on which the modulation frequency is dependent are the wavelength of the laser light and the angle at which the beams intersect. Neither of these can easily be varied to adjust the modulation frequency. The cross-beam velocimeter is also susceptible to lateral movement of the shaft and provides an incorrect indication of the speed of movement of the shaft surface if the axial motion of the shaft has a velocity component in the plane defined by the incident laser beams.

SUMMARY OF THE INVENTION

In accordance with the invention, there is provided a method of monitoring non-uniform motion at the surface of a body, the method comprising the steps of:

directing two spaced, parallel beams of coherent light onto the said surface; and directing the combined intensity of the light backscattered along the axes of said beams from the points at which said beams are incident on said surface; the frequency at which the detected intensity is modulated being dependent on the difference of the velocities of the surface of the said two points.

BRIEF DESCRIPTION OF THE DRAWINGS

Embodiments of the invention will now be described in detail, by way of example, with reference to the drawings, in which.

DESCRIPTION OF THE PREFERRED EMBODIMENTS

Figure 1:
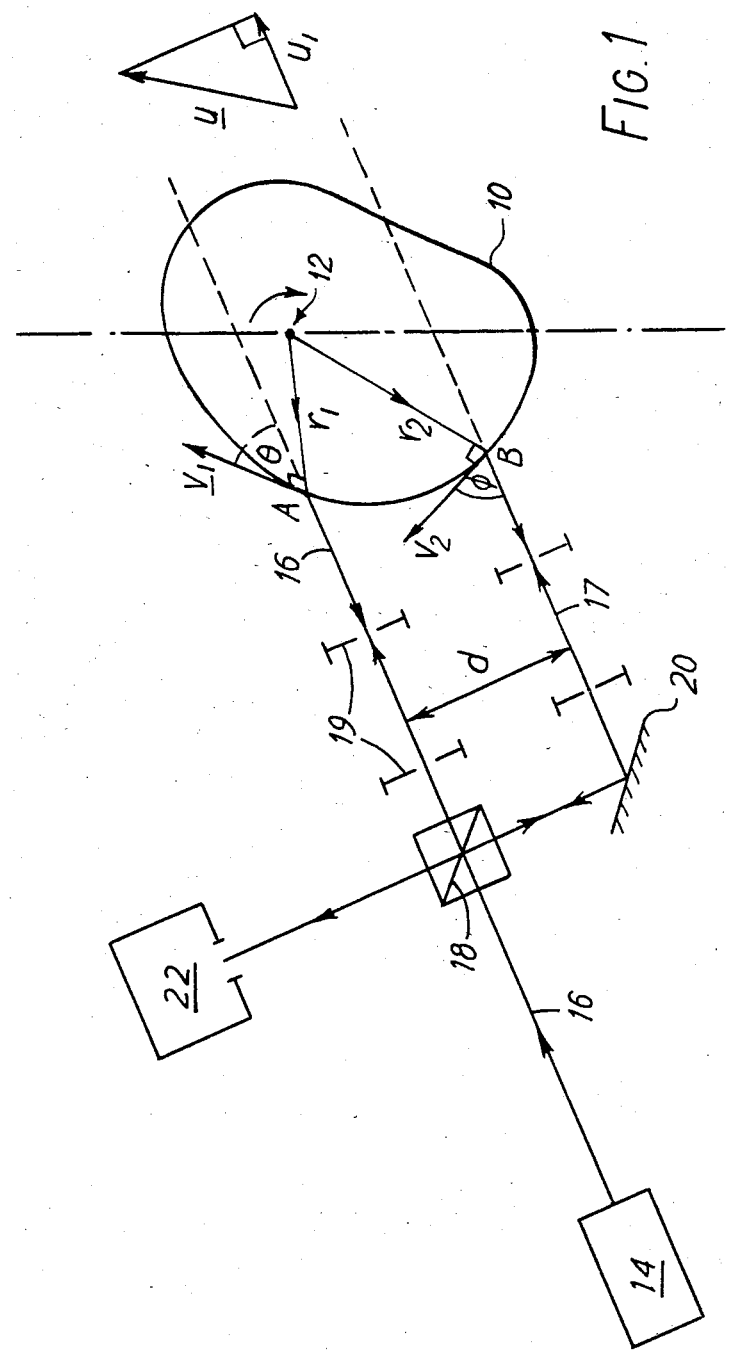
FIG. 1 is a diagram illustrating a method of measuring torsional vibration in accordance with the invention.

The arrangement shown in FIG. 1 is used to measure torsional vibrations, that is variations in the speed of rotation, of a rotary shaft 10 of arbitrary cross-section, for example, in the case of a conventional shaft, of circular cross-section. The shaft 10 rotates about its axis 12 and also experiences an instantaneous lateral movement at a velocity vector U.

The beam 16 from a laser light source 14 is directed towards the surface of the shaft 10 and is split, in a conventional manner, by means of a 50% transmission-reflection beamsplitter 18 and a mirror 20 to form two parallel beams 16 and 17, separated by a distance d, which strike the surface of the shaft 10 at points A and B respectively. The rotation of the shaft 10 about the axis 12 is such that its surface moves with nominal tangential velocities $V_1$ and $V_2$ at points A and B respectively.

The laser light source 14 may, for example, be a helium-neon laser. The source used may have a low power output in order to comply with safety regulations and a typical output would be of the order of 2 milliwatts so that, after splitting, each beam seen by the user has a power output of not more than 1 milliwatt. One suitable helium-neon laser light source is that manufactured by Hughes Ltd., of Carlsbad, Calif. U.S.A. The beamsplitter 18 and mirror 20 may be of any conventional type and may be replaced with a number of other conventional arrangements for providing two parallel laser beams, the separation of which can be varied.

As the surface of the shaft 10 is moving, the frequency of the light scattered by the surface at the points A and B is Doppler shifted. The light which is backscattered along the axes of the incident beams 16 and 17 is collected through four masks 19 which strictly define the solid angle of backscattered light which is collected. The collected light is mixed at the beam-splitter 18 before being received by a photo-detector 22. In order to ensure that a sufficent amount of light is backscattered to the photodetector 22, the surface of the shaft 10 may be treated with retro-reflective tape or paint.

Typically, the photodetector 22 is a photomultiplier, for example, the Type 965 8B photomultplier manufactured by EMI Limited, of 20 Manchester Square, London, W1 or a solid state photodiode. For compactness, it is preferred to use a solid state device.

The shift in the frequency $F_A$ of the light backscattered along the incident beam axis at point A, is given by $$F_A = \frac{2\mu}{\lambda} (V_1 \cos \theta + U_1)$$

where $\mu$ is the refractive index of air, $\lambda$ is the wavelength of the laser light used, $\theta$ is the angle between the axis of incident laser beam 16 and the direction of motion of the shaft surface at point A and $U_1$ is the component of the lateral velocity of the shaft 10 along the direction of the beam 16.

Similarly, the shift in the frequency $F_B$ of the light backscattered along the incident beam axis at point B, is given by $$F_B = \frac{2\mu}{\lambda} (U_1 - V_2 \cos \phi)$$

where $\phi$ is the angle between the axis of beam 17 and the direction of motion of the shaft surface at point B.

Light which is backscattered from the points A and B along the directions of the incident beams 16 and 17 is directed into the photodetector 22. As the light emitted by the laser 14 is coherent and essentially single frequency, the backscattered light from points A and B heterodynes at the detector 22 and the detected light intensity is modulated at a frequency F given by $$F = F_A - F_B = \frac{2\mu}{\lambda} \cdot (V_1 \cos \theta + V_2 \cos \phi)$$

It follows that:

$$F = \frac{\pi\mu N}{15\lambda} \cdot (r_1 \cos \theta + r_2 \cos \phi)$$

where $r_1$ and $r_2$ are the radial distances of points A and B from the axis of rotation 12 and N is the rotational speed in r.p.m. Further $$(r_1 \cos \theta + r_2 \cos \phi) = d$$

where d is the distance between the incident beams 16 and 17. Consequently $$F = \pi\mu d N / 15\lambda$$

From this, it can be seen that the frequency at which the detected light intensity is modulated is directly proportional to the rotational speed of the body. If the modulation frequency is monitored over a period of time, variations in the modulation frequency will, therefore provide an accurate indication of the level of torsional vibration in the shaft.

This method has a number of advantages over that employed in the cross-beam laser-Doppler velocimeter described above. The distance from the laser source to the shaft surface can easily be varied because the beams used are parallel and there is no need to position the source so that the shaft surface lies within the small region in which the beams intersect. The parallel beam arrangement is insensitive to lateral and axial movement of the shaft and consequently the method can successfully utilize a hand-held laser source and detector.

Although tilting does affect the output of the device, body movement only introduces frequencies of 30 Hz and less and, as these are considerably lower than the vibrational frequencies being measured, the low frequency signals can, if necessary be filtered out.

The photodetector output can be processed using a commercially available Doppler frequency tracker or using a ratemeter which is essentially a zero-crossing counter which can convert the Doppler frequency to an analogue voltage. The ratemeter output is gated so that, if the photodetector output amplitude drops below a threshold level due to amplitude modulation caused by "speckle" effects, that is, effects due to phase differences between light scattered from points A and B, the ratemeter output remains at the last frequency value which occured before the drop. The gating causes "flats" in the detected Doppler frequency but the flats are in practice very short compared to the vibrational frequencies which are to be measured and the flats simply contribute to the instrument noise level.

The modulation frequency can be adjusted to suit the electronic circuitry used to process the detector output simply by altering the separation of the beams 16 and 17. This may be done, for example, by moving the mirror 20 towards or away from the beamsplitter 18. In some circumstances, it is desirable that the modulation frequency should have a non-zero value when the shaft is stationary. This can be achieved by introducing a frequency shifting device, for example, a diffraction grating or a Bragg cell, in a conventional manner into the path of one of the beams 16 or 17 so that its frequency is pre-shifted by a fixed amount relative to the other.

Although, in the arrangement shown in the drawings, the beams are directed onto the surface of the shaft 10, it is also possible to direct the beams onto the radial end surface of the shaft. Using the end surface of the shaft introduces a cosine factor into the relationship between the Doppler frequency and rotational speed of the shaft. Consequently, when the device is hand held, tilting will introduce spurious variations in the Doppler frequency due to variations in the cosine factor but, again, only at frequencies at 30 Hz or less.

Figure 2:
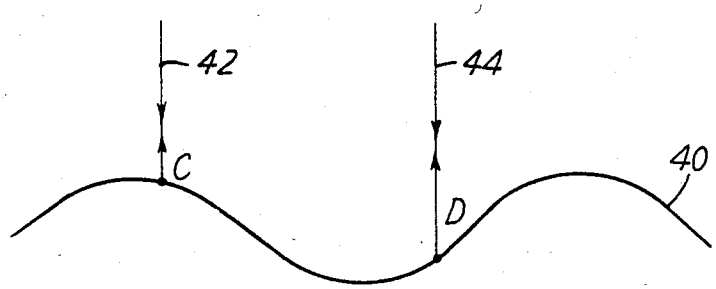
FIG. 2 is a diagram illustrating a method of measuring phase differences in accordance with the invention.

The same optical apparatus can be used to measure the phase difference between two points along a travelling wave as indicated in FIG. 2.

A travelling wave may be set up in the solid surface 40 of a machine part by, for example, periodic contact with another machine component. If the optical arrangement described above in relation to FIG. 1 is used to direct parallel laser beams 42 and 44 onto the surface 40 so that they strike the surface at points C and D respectively, the light scattered at points C and D is Doppler shifted because the surface 40 is moving. Provided that points C and D are not exactly in phase, the linear velocities of the surface 40 at points C and D differ at any given time and the frequency of the light scattered at points C and D is shifted by different amounts. As described above, the light received by the detector (not shown) heterodynes and the frequency of the detected intensity modulation is a measure of the phase difference between points C and D along the wave. When the modulation frequency is zero, points C and D are exactly in phase and the beam separation, d, is equal to an integral number of wavelengths. Phasemeteres of this kind are useful in identifying the vibration power flow through structures.

When the instrument is to be used as a phasemeter, it is generally desirable to pre-shift the frequency of one of the beams as described as above so that zero surface movement still produces a heterodyne frequency.

Figure 3:
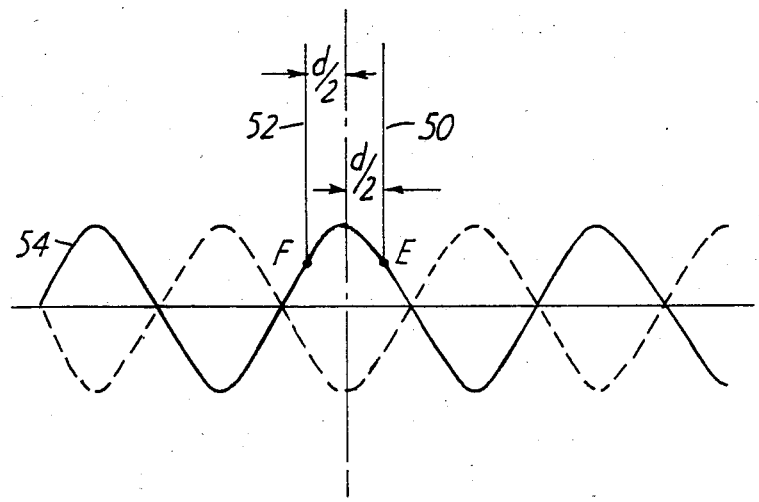
FIG. 3 is a schematic diagram illustrating a method of modal analysis in accordance with the invention.

The instrument can only be used when a single frequency travelling wave is present. When several waves are present, the situation is more complex but the instrument can still be used in modal analysis. When several travelling waves interfere in a continuously vibrating structure a well-defined modal pattern of nodes and anti-nodes may occur. The instrument may be used, as shown in FIG. 3 to identify the anti-nodes.

Two parallel laser beams 50 and 52 produced by the optical arrangement described in relation to FIG. 1 are directed onto a vibrating surface 54 so that they are incident on the surface at points E and F. If points E and F are symmetrically disposed about a vibrational anti-node, the surface at both points E and F moves at the same speed and in the same direction and the frequencies of both beams 50 and 52 are Doppler shifted by the same amount. Consequently, the modulation frequency at the detector is zero. If points E and F are not symmetrical about an anti-node the detected frequency takes on a positive value. Thus, the instrument can be used to identify the anti-nodes of the modal pattern by passing the beams over the surface and identifying those points at which the detected frequency drops to zero.

The method described above can, in general, be used to measure the difference in velocity at two points on any surface. It can, therefore, be used to characterise any vibrational motion.

What is claimed is:

1. A method of monitoring the rotational speed of a rotating body, the method comprising the steps of:
    directing two spaced parallel beams of coherent light onto said body;
    combining the light backscattered from said body along the paths of said two beams to form an optical heterodyne; and
    detecting intensity and frequency of the combined heterodyned light so that the heterodyne frequency provides an indication of the instantaneous rotational speed of the body.

2. The method of claim 1 wherein said beams are provided by a laser.

3. The method of claim 1 wherein the separation of said beams is variable.

4. The method of claim 1, wherein said beams are directed onto said body from a direction such that the points at which said beams are incident on said body lie in a plane inclined to the axis of rotation of the body.

5. A method of monitoring the rotational speed of a rotating body, the method comprising the steps of:
    directing two spaced parallel beams of coherent light onto said body;
    combining the light backscattered from the body along the paths of said two beams to form an optical heterodyne;
    detecting the intensity and frequency of the combined heterodyned light; and
    calculating the rotational speed of the body from the heterodyne frequency according to the formula $$F = \pi \mu d N / 15 \lambda$$

where F is the heterodyne frequency, $\mu$ is the refractive index of air, d is the separation distance between the spaced parallel beams, N is the rotational speed in revolutions per minute and $\lambda$ is the initial wavelength of the coherent light.

6. A method of monitoring the motion of a surface along which a single frequency travelling wave is passing, the method comprising the steps of:
    directing two spaced parallel beams of coherent light onto said surface;
    combining the light backscattered from said surface along the paths of said two beams to form an optical heterodyne; and
    detecting the intensity and frequency of said combined heterodyned light so that the heterodyne frequency gives an indication of the difference in phase of the traveling wave between the points at which said beams are incident on said surface.

7. Apparatus for monitoring the rotational speed of a rotating body, said apparatus comprising:
    source means for directing two spaced parallel beams of coherent light onto said rotating body;
    photoelectric detector means; and
    means for directing light which is backscattered from the body along the paths of said two beams into said photoelectric detector means where it forms an optical heterodyne, said photoelectric detector means producing an output signal which is dependent on the intensity of said received light for indicating the rotational speed of the body.

8. The apparatus of claim 7, wherein said source includes a laser.

9. The apparatus of claim 8 including means for varying the separation of said beams.

* * * * *